(12) United States Patent
Daprocida

(10) Patent No.: US 11,959,665 B2
(45) Date of Patent: Apr. 16, 2024

(54) ENHANCED GEOTHERMAL RESERVOIR RECOVERY SYSTEMS AND METHODS

(71) Applicant: Domenico Daprocida, Calgary (CA)

(72) Inventor: Domenico Daprocida, Calgary (CA)

( * ) Notice: Subject to any disclaimer, the term of this patent is extended or adjusted under 35 U.S.C. 154(b) by 0 days.

(21) Appl. No.: 17/355,708

(22) Filed: Jun. 23, 2021

(65) Prior Publication Data
US 2022/0412608 A1    Dec. 29, 2022

(51) Int. Cl.
*F24T 10/20* (2018.01)
*F24T 10/30* (2018.01)
*F24T 10/00* (2018.01)

(52) U.S. Cl.
CPC .............. *F24T 10/20* (2018.05); *F24T 10/30* (2018.05); *F24T 2010/50* (2018.05)

(58) Field of Classification Search
CPC .......... Y02E 10/10; F24T 10/20; F24T 10/10; F24T 10/30; F24T 2010/50; E21B 43/24; E21B 43/305; E21B 43/126; E21B 43/25; E21B 41/0057; E21B 43/168; E21B 43/18; F03G 7/04
USPC ...................... 166/52, 302; 165/45
See application file for complete search history.

(56) References Cited

U.S. PATENT DOCUMENTS

| | | | | |
|---|---|---|---|---|
| 3,073,386 A | * | 1/1963 | Bertuzzi | E21B 43/18 166/263 |
| 3,765,477 A | * | 10/1973 | Van Huisen | F24T 10/20 976/DIG. 425 |
| 5,082,492 A | * | 1/1992 | Gallup | C01D 3/16 75/712 |
| 7,845,406 B2 | | 12/2010 | Nitschke | |
| 8,657,000 B2 | | 2/2014 | Willingham et al. | |
| 9,376,885 B2 | | 6/2016 | Bour et al. | |
| 9,726,157 B2 | | 8/2017 | Sweatman et al. | |
| 10,385,666 B2 | | 8/2019 | Stanecki et al. | |
| 10,443,364 B2 | | 10/2019 | Parrella et al. | |
| 2007/0245729 A1 | * | 10/2007 | Mickleson | F01K 23/02 60/641.2 |
| 2010/0163231 A1 | * | 7/2010 | Balczewski | E21B 43/24 166/57 |

(Continued)

FOREIGN PATENT DOCUMENTS

WO    WO-2013169242 A1 * 11/2013 ............. E21B 43/25

*Primary Examiner* — Wesley G Harris
(74) *Attorney, Agent, or Firm* — Lewellyn Law, PLLC; Stephen Lewellyn

(57) ABSTRACT

The present disclosure relates to systems and methods of enhanced geothermal energy production that transports fluid from existing underground fluid reservoirs to a deeper, higher temperature radiator zone for fluid heating before recovery at the surface. One system includes at least one radiator injection well extending from a subterranean water reservoir of a formation to a radiator zone of the formation that is located at a greater depth than the subterranean water reservoir. The radiator injection well is configured to fluidically couple the subterranean water reservoir with the radiator zone to transfer fluid contained in the subterranean water reservoir to the radiator zone for heating. At least one recovery well extends from the surface to the radiator zone and is configured to recover fluid from the radiator zone that was transferred from the subterranean water reservoir to the radiator zone. The recovered fluid is then used at the surface to generate electricity.

16 Claims, 2 Drawing Sheets

(56) References Cited

U.S. PATENT DOCUMENTS

2015/0354859 A1    12/2015   Marsh et al.
2020/0217181 A1     7/2020   Norbeck et al.

\* cited by examiner

ENHANCED GEOTHERMAL RESERVOIR RECOVERY SYSTEMS AND METHODS

FIELD OF THE INVENTION

The present disclosure relates to geothermal energy production and, more particularly, to systems and methods of enhanced geothermal energy production that transports fluid from existing underground water reservoirs to a higher temperature radiator zone for heating before recovery.

BACKGROUND OF THE INVENTION

Geothermal Energy is classified as a "green" energy source by the United States Environmental Protection Agency. Conventional geothermal technology used by the industry consists in drilling bore holes to a subterranean hot fluid reservoir, freeing and directing steam to the surface and generating power with gas turbine systems. Water can be recovered and reinjected into the water reservoir to create a heating cycle. Alternatively, if there is no water reservoir available underground, surface water can be injected in a naturally permeable and geological formation. Steam produced is then directed to the surface for producing power. If the geological formation has low permeability or is impermeable, permeability can be enhanced in injecting high-pressure fluids, which triggers shear events that enhance the system's permeability.

Some geological formations contain large fluid reserves that are preheated but would not provide enough steam to be economically viable. Accordingly, there is a need and desire for systems and methods to collect and transport a subterranean fluid to a permeable geological formation for further heating, producing steam, and economically generating power.

SUMMARY OF THE INVENTION

The present disclosure provides enhanced geothermal reservoir recovery systems and methods that collects and transports fluid from naturally occurring subterranean water reservoirs to a deeper depth in the earth for heating the fluid before recovering the fluid at the surface for use in generating electricity.

In general, in one aspect, a geothermal well system is provided. The system includes at least one radiator injection well extending from a subterranean water reservoir of a formation to a radiator zone of the formation that is located at a greater depth than the subterranean water reservoir. The radiator injection well is configured to fluidically couple the subterranean water reservoir with the radiator zone to transfer fluid contained in the subterranean water reservoir to the radiator zone for heating. At least one recovery well extends from the surface to the radiator zone and is configured to recover fluid from the radiator zone that was transferred from the subterranean water reservoir to the radiator zone. The recovered fluid is then used at the surface to generate electricity.

In general, in another aspect, a geothermal well system is provided. The system includes a recovery well extending from the surface to a subterranean formation into a radiator zone of the formation that is deeper than a subterranean water reservoir in the formation. The recovery well having a section extending horizontally through the radiator zone and an upturned section extending upwardly from the horizontally extending section in a direction toward the subterranean water reservoir and into the subterranean water reservoir. The horizontally extending section provides a heat transfer section wherein heat from the radiator zone is transferred into fluid from the subterranean water reservoir as the fluid flows through the horizontally extending section. A pump is operatively connected to the recovery well to recover fluid from the subterranean water reservoir at the surface. The recovered fluid is then used at the surface to generate electricity.

In general, in another aspect, a method of extracting thermal energy from a subterranean formation is provided. The method includes: establishing a fluid connection between a subterranean water reservoir of a formation and a radiator zone of the formation that is located at a depth greater than the depth of the subterranean formation; causing a fluid contained in the subterranean water reservoir to flow along the radiator zone to heat the fluid to a temperature higher than its temperature when entering the radiator zone; and recovering the fluid from the radiator zone at the earth's surface via at least one recovery well. The recovered fluid is then used at the surface to generate electricity.

In aspects, if a radiator zone is naturally permeable to satisfy fluid heating and power requirements, enhancing the radiator zone permeability, for example by fluid-shearing or fracking of a radiator zone stratum, may not be required.

In aspects, a radiator zone may not have a sufficient permeability or be in fact impermeable. A radiator zone may be stimulated to enhance its fluid conductivity. Water and or other chemicals may be injected at high pressure to create fractures through shearing events. To be economically viable, a fracking process requires enough rock shearing to heat and sustain a fluid volumetric flowrate. To ensure a constant high temperature and volumetric fluid flowrate, a radiator zone pressure needs to be maintained overtime for keeping open the fractures and pores.

In aspects, a fluid reservoir may also be pressurized enough to maintain temporarily pressure requirements for fluid recovery therefore a gas injection system may not be initially required.

In aspects, fluid may contain hydrocarbon gas and/or a fluid reservoir pressure may be too low to satisfy heating and power requirements of a geothermic system. In aspects, gas injection may be required to purge a fluid from hydrocarbon gas. Gas injected also may maintain pressure on a fluid reservoir which maintains the required pressure gradient for getting a fluid flowing in a high-energy radiator zone. In aspects, to offset a lack of fluid reservoir or radiator recovery pressure, a pumping system may also be used to transport a fluid collected from a reservoir to the surface via a radiator zone.

Numerous additional objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature or a feature with similar functionality. In the drawings.

DETAILED DESCRIPTION

Figure 1:
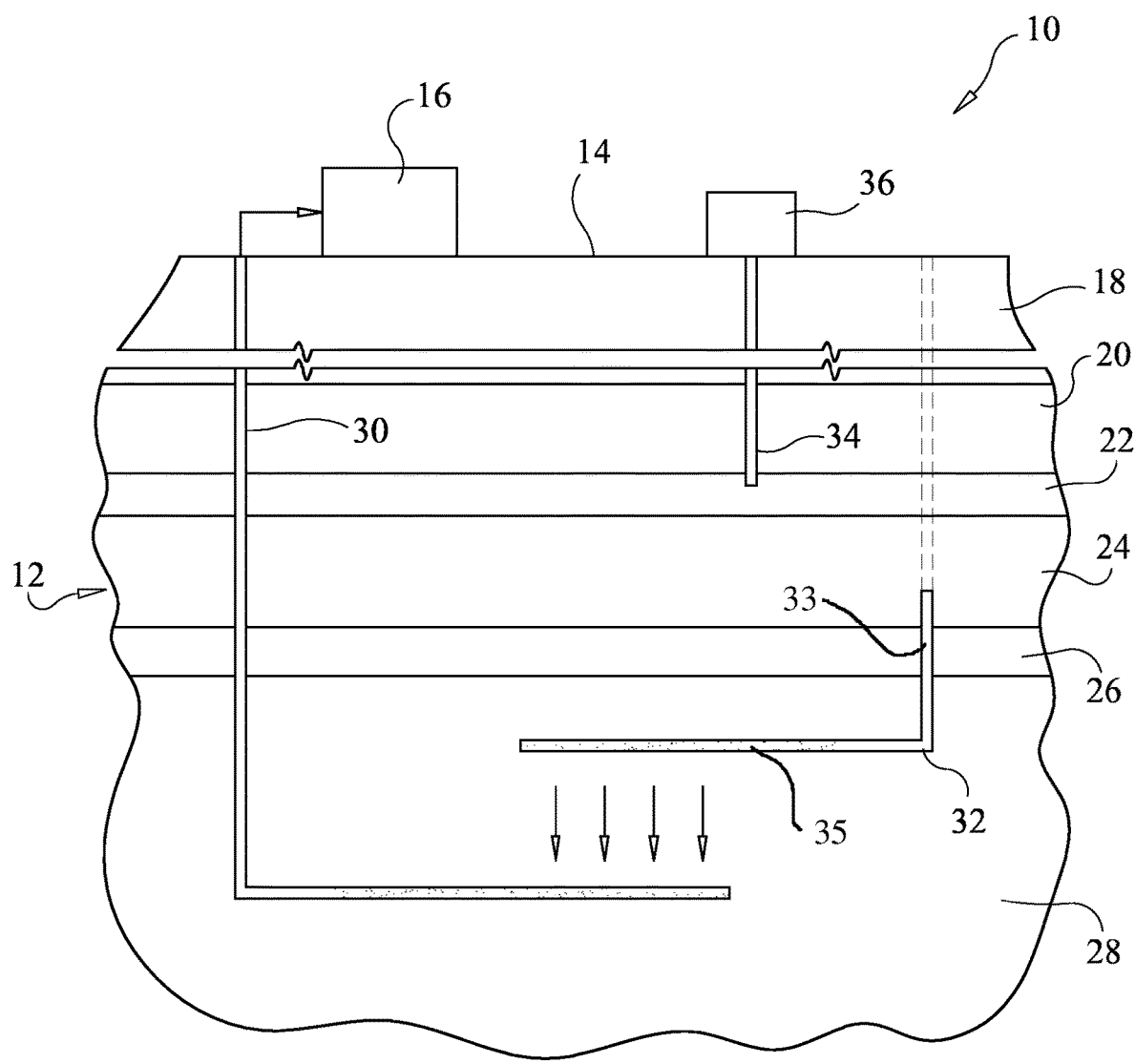
FIG. 1 illustrates an exemplary enhanced geothermal reservoir recovery system, according to one or more embodiments.

Referring to FIG. 1 of the drawings, there is diagrammatically illustrated an enhanced geothermal reservoir recovery system 10 in accordance with at least one embodiment. System 10 is used the extract heat from a subterranean formation 12 for use at the surface 14 by a geothermal powerplant 16 for producing electricity. Particularly, system 10 is configured to provide a heated working fluid from the formation 12 to the surface to be used in generating electricity by the powerplant 16.

Advantageously, system 10 can make use an of inactive or depleted hydrocarbon reservoir and, depending on the geology of the reservoir, possibly benefit from additional hydrocarbon recovery from the reservoir. However, it should be noted that system 10 is not limited in such application and can be implemented in any formation having a subterranean water reservoir.

As representatively shown, the formation 12 is of a depleted hydrocarbon formation including, for example, a grade or surface zone 18, a hydrocarbon zone 20, a gas zone 22, a fluid reservoir 24, and intermediate zone 26, and a high temperature zone or radiator zone 28. It is important to note that the formation illustrated in FIG. 1 is representative only. Geological formations vary from one another, and therefore the methods and systems described herein should not be limited solely to the formation as representatively shown in FIG. 1. Additionally, the systems and methods described herein do not need to be used in connection with a depleted or inactive hydrocarbon formation.

Typically, subterranean fluid reservoirs may be found between 1 km and 4 km, however reservoirs can be found as deep as 12 km or even deeper. Typical radiators depth may be found between 3 km and 5 km, but they can be found as deep as 12 km or even deeper. Because earth temperature gradient increases with depth, a temperature of a fluid reservoir 24 should be lower than the temperature of a radiator zone 28. Depending on geological formations and depth, a typical geological temperature gradient will vary between 20° C./km to 45° C./km. Some fluid reservoir geology formations may have a temperature gradient between 15° C./km to 60° C./km. Conversely, initial pressure of a fluid reservoir 24 may be naturally or artificially higher than a radiator zone 28. A typical hydrostatic water reservoir 24 may range between 25 to 60 MPa, however some geology formations may vary from 7 to 90 MPa. A typical radiator zone 28 temperature would vary from 150° C. to 300° C., however radiators zones may be as high as 500° C. or over.

As further shown in FIG. 1, system 10 includes at least one recovery well 30 that extends through formation 12 and then runs horizontally in the radiator zone 28. For the purpose of this disclosure, horizontally means deviating in a direction laterally from the vertical. For example, any well bore that extends laterally outward from the vertical section extending into the formation from the surface is considered horizontally extending. The horizontal run of the recovery well 30 is fluidically established with the radiator zone 28 to receive fluid therefrom for recovery at the surface 14. Geographic disposition one or more recovery wells will be made based on geology formation configurations and surface topographies. In some embodiments, existing wells may also be repurposed to extract geothermal energy.

System 10 further includes one or more radiator injection pipes or wells 32. The radiator injection well 32 has a perforated horizontal segment disposed within the radiator zone 28 at a depth less than the horizontal run of the recovery well 30. A vertical segment of the radiator injection well 32 is fluidically communicated with the fluid reservoir 24 to establish a fluid flow from the fluid reservoir to the radiator zone 28 for the purpose of transporting fluid from the fluid reservoir into the radiator zone for heating. The radiator injection 32 well has a first section 33 that is disposed in the subterranean water reservoir and in fluidic communication therewith. The first section 33 extends downwardly in the formation and into the permeable radiator zone 28. The radiator injection well 32 further has a second section 35 that extends from the first section 33 in a direction horizontally in the radiator zone 28. Geographic disposition one or more radiator injection wells will be made based on geology formation configurations and surface topographies.

Once in the radiator zone 28, the fluid is heated by the geologic heat of the strata of the radiator zone as the fluid permeates or flows through the radiator zone strata toward the recovery well 30. Heated fluid is then removed from the radiator zone 28 by the recovery well 30 and produced or recovered at the surface 14 for use by the powerplant 16 for generating electricity. The fluid will feed geothermal driven turbine systems of the powerplant, such as flash and/or binary steam technologies to produce power. A fluid reject from powerplant may be injected back into the fluid reservoir 24 through one or more injection wells (not shown). As alternatives, the fluid reject may be reprocessed based on the remaining temperature and/or chemical content prior being reinjected in the fluid reservoir 24 or disposal.

Radiator zone 28 permeability is geologically dependent. A high permeability may naturally occur because of existing cracks and fractures in the radiator zone. Conversely, a geological formation may be partially permeable or impermeable. If the radiator zone 28 is highly permeable, it may not require enhancement for promoting water diffusion and water heating. However, if the radiator zone 28 does not have sufficient permeability or is impermeable, enhancement may be made in injecting high-pressure water, chemicals or both for fluid-shearing or fracking according to known methods or future developed methods.

The pressure of the fluid reservoir 24 may not be sufficient to provide fluid transport from the fluid reservoir into the radiator zone 28. In such cases, gas injection may be used to increase the pressure of the fluid reservoir 24 to promote fluid transport. Gas injection may be accomplished by one or more gas injection wells 34 that are completed with the fluid reservoir 24 for injecting gas into the reservoir from the surface 14 by gas injection system 36. The heated fluid will be pressurized enough to meet the surface 14 through radiator recovery well 30.

The fluid reservoir 24 may be in contact with a hydrocarbon zone 20 and may be contaminated by hydrocarbon. Gas injection may produce a gas zone 22 which may assist the removal of hydrocarbon in a fluid phase.

The fluid reservoir 24 may not be pressurized sufficiently and/or there is too much head loss in the radiator zone 28 to provide fluid transported to the surface 14, system 10 may include one or more artificial lift systems, such as, for example pump to provide the necessary recovery of the heated fluid from the radiator zone.

In some embodiments, a hydrocarbon zone 20 may not be present. If a fluid reservoir 24 is pressurized enough to sustain fluid production from the radiator zone 28, gas injection system or a pumping may not be initially required.

In some embodiments, a hydrocarbon zone 20 may be present but separated from a fluid reservoir 24 by an impermeable geological formation and therefore no fluid phase contamination occurred. If those conditions exist and if the fluid reservoir 24 is pressurized enough to sustain fluid production from the radiator zone 28, gas injection systems or pumping may not be initially required.

Figure 2:
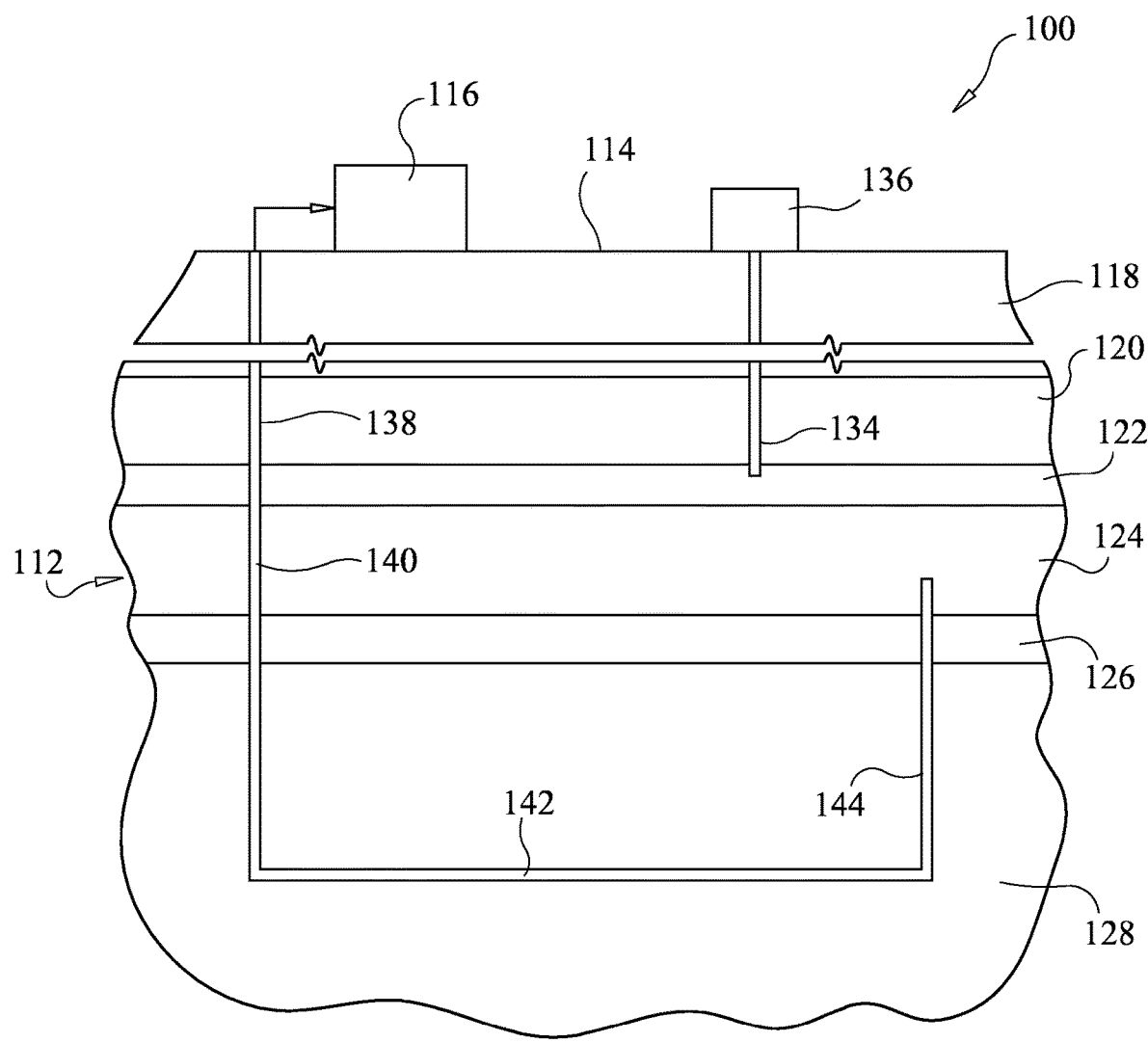
FIG. 2 illustrates another exemplary enhanced geothermal reservoir recovery system, according to one or more embodiments.

Referring to FIG. 2, there is diagrammatically illustrated an enhanced geothermal reservoir recovery system 100 in accordance with at least one embodiment. System 100 can be employed, for example, when the permeability of radiator zone 128 is not sufficient to allow a fluid flow through the zone without enhancing the permeability of the strata of the zone. For example, it may be undesirable or not possible to enhance the permeability of the radiator zone strata, in such instances, system 100 is desirable. The reference numbers for the same or similar elements from system 10 have been increased by 100 and do not require repeating to understand the construction and operation of system 100.

Still referring to FIG. 2, system 100 includes one or more recovery wells 138 in the formation 112. Each recovery well 138 includes a first vertical section 140, a horizontal section 142, and a second vertical section 144. The first vertical section 140 runs to the surface 114, the horizontal section 142 extends through the radiator zone 128, and the second vertical sections runs from the radiator zone to the reservoir 124. The first and second vertical sections 140 and 144 are connected by the horizontal section 142. These three sections, collectively, form a recovery well. Geographic disposition of a plurality recovery wells can be made based on geology formation configurations and surface topographies.

Radiator zone 128 physical characteristics provide a specific heat transfer rate to fluid transiting toward the surface. The configuration, depths, diameters, lengths, and quantities of each recovery well 138 needs to be considered for designing a fluid energy transfer system. In an embodiment and depending on formation properties of intermediate or radiator zones 126 and 128, and where applicable, recovery well 138, horizontal section 142 and vertical section 144, may also be completed as open hole.

Here, fluid in the reservoir 124 is transported from a shallower depth into the deeper radiator zone 128 through section 144, then across the radiator zone through section 142, where the fluid is heated to by heat transfer between the formation of the radiator zone with the recovery well 138, and then the heated fluid is recovered at the surface 114 through section 140. At the surface, the heated fluid is used by power plant 116 to produce electricity.

Strainers or filters may be used, for example at the intake of section 144, to prevent particulates, debris, and sand entrainment from entering the recovery well 138.

It is contemplated that the pressure of fluid reservoir 124 may not be sufficient to produce fluid from the reservoir at the surface through the recovery well 138. Therefore, pumps (not shown) may be employed either downhole or at the surface 114 to recover the fluid at the surface for use by the powerplant 116.

In addition, or as a possible alternative to pumps, gas injection may be used to increase the pressure of the fluid reservoir 124 to promote fluid transport. Gas injection may be accomplished by one or more gas injection wells 134 that are completed with the fluid reservoir 124 for injecting gas into the reservoir from the surface 114 by gas injection system 136. The heated fluid may then be pressurized enough to meet the surface 114 through radiator recovery well 138 without using pumps.

In some embodiments, a hydrocarbon zone 120 may not be present. If a fluid reservoir 124 is pressurized enough to sustain fluid production from the radiator zone 128, gas injection system or a pumping may not be initially required.

In some embodiments, a hydrocarbon zone 120 may be present but separated from a fluid reservoir 124 by an impermeable geological formation and therefore no fluid phase contamination occurred. If those conditions exist and if the fluid reservoir 124 is pressurized enough to sustain fluid production from the radiator zone 128, gas injection systems or pumping may not be initially required.

While the invention has been particularly shown and described with respect to the illustrated embodiments thereof, it will be understood by those skilled in the art that the foregoing and other changes in form and details may be made therein without departing from the spirit and scope of the invention. Further the configuration and arrangement of the invention should not be limited solely to those shown in the figures of the drawings. As described above, the configuration will be highly dependent upon the geological properties of the formation. Additionally, the foregoing described embodiments should not be considered mutually exclusive. Enhanced geothermal energy production systems and methods according to this disclosure could employ one or more recovery wells 30 and one or more recovery wells 138 as desired within the same system.

Further yet, enhanced geothermal energy production systems and methods according to this disclosure could use more than one naturally occurring subterrane water reservoir and is not limited in scope to a single water reservoir.

Accordingly, the foregoing detailed description is to be clearly understood as being given by way of illustration and example only, the spirit and scope of the present invention being limited solely by the appended claims and their equivalents.

What is claimed is:

1. A geothermal well system comprising:
   at least one radiator injection well extending from subterranean water reservoir of a formation to a permeable radiator zone of the formation, wherein the radiator zone is located at a greater depth than the subterranean water reservoir and the at least one radiator injection well fluidically coupling the subterranean water reservoir with the radiator zone to directly transfer fluid contained in the subterranean water reservoir into the radiator zone for heating;

the at least one radiator injection well has a first section and a second section, the first section has an end that is disposed in the subterranean water reservoir and fluidically connected to the subterranean water reservoir to directly receive fluid from the subterranean water reservoir, the first section extending from the end in a direction downwardly in the formation and into the permeable radiator zone, the second section extends from the first section in a direction horizontally in the radiator zone and the second section being open to the radiator zone to permit fluid from the second section to flow into the radiator zone, wherein fluid from the water reservoir flows from the water reservoir to the radiator zone entirely within the formation by the first and second sections of the at least one radiator injection well; and at least one recovery well extending from the surface of the earth to the radiator zone and being configured to recover the fluid transferred from the subterranean water reservoir to the at least one radiator zone by the radiator injection well.

2. The geothermal well system of claim 1, wherein:
the second section of the least one radiator injection well is located in the radiator zone at a first depth; and
the at least one recovery well includes a section extending horizontally in the radiator zone at a second depth that is greater than the first depth.

3. The geothermal well system of claim 2, wherein the second section of the at least one recovery well is perforated.

4. The geothermal well system of claim 1, wherein:
the subterranean water reservoir has a first pressure, and the radiator zone has a second pressure that is lower than the first pressure and wherein fluid in the subterranean water reservoir is caused to flow into and through the radiator injection well and into the at least one radiator zone by a pressure differential between the first and second pressures; and
further comprising at least one gas injection well extending from the surface to the formation and configured to inject gas into the subterranean water reservoir to increase the first pressure.

5. The geothermal well system of claim 1, wherein the permeability of the radiator zone is enhanced to have a greater permeability than its naturally occurring permeability.

6. The geothermal well system of claim 1, wherein the formation includes a depleted hydrocarbon reservoir.

7. A geothermal well system comprising:
a recovery well extending from the surface of the earth to a subterranean formation and into a radiator zone of the formation that is deeper than a subterranean water reservoir in the formation, the recovery well having a first section extending into the formation from the surface of the earth, a second section extending horizontally from the first section and through the radiator zone, and third upturned section extending upwardly from the second section in a direction toward the subterranean water reservoir and into the subterranean water reservoir;

the upturned section of the recovery well having an end disposed in the subterranean water reservoir and the end is fluidically connected to the subterranean water reservoir such that fluid in the subterranean water reservoir flows into and downwardly in the upturned section and into the second section without the fluid from the subterranean water reservoir exiting the formation;

the second section providing a heat transfer section wherein heat from the radiator zone is transferred into fluid from the subterranean water reservoir as the fluid flows through the horizontally extending section; and wherein fluid from the subterranean water reservoir is recovered at the surface from the horizontally extending section through the first section.

8. The geothermal well system of claim 7, further comprising:
at least one gas injection well extending from the surface to the formation and configured to inject gas into the subterranean water reservoir to increase a pressure of the subterranean water reservoir.

9. The geothermal well system of claim 7, further comprising:
a sand filter operatively connected to the recovery well to filter sand and particulates from the fluid of the subterranean water reservoir as it conducts into the recovery well.

10. The geothermal well system of claim 7, wherein at least a section of the recovery well is an open hole not having well casing pipe.

11. A method of extracting thermal energy from a subterranean formation comprising:
establishing a direct fluid connection between a naturally occurring subterranean water reservoir of the formation and a permeable radiator zone of the formation that is located at a depth greater than a depth of the subterranean water reservoir by a radiator injection well;

the radiator injection well has a first section and a second section, the first section has an end that is disposed in the subterranean water reservoir and fluidically connected to the subterranean water reservoir to directly receive fluid from the subterranean water reservoir, the first section extending from the end in a direction downwardly in the formation and into the permeable radiator zone, the second section extends from the first section in a direction horizontally in the radiator zone and the second section being open to the radiator zone to permit fluid from the second section to flow into the radiator zone, wherein fluid from the water reservoir flows from the water reservoir to the radiator zone entirely within the formation by the first and second sections of the radiator injection well;

causing the fluid contained in the subterranean water reservoir to directly flow through the radiator injection well into and along the radiator zone to heat the fluid to a temperature higher than its temperature when entering the radiator zone by a pressure difference between the subterranean water reservoir and the radiator zone, wherein the subterranean water reservoir has a first pressure and the radiator zone has a second pressure that is lower than the first pressure; and recovering the fluid from the radiator zone at the surface of the earth via at least one recovery well.

12. The method of claim 11, further comprising:
using the recovered fluid, at the surface, in a generation of electricity.

13. The method of claim 11, wherein the step of recovering the fluid from the radiator zone further comprises recovering the fluid via the at least one recovery well that extends from the surface to the radiator zone.

14. The method of claim 13, wherein the at least one recovery well includes a horizontal section extending along the radiator zone.

15. The method of claim 11, wherein the step of causing the fluid contained in the subterranean water reservoir to flow further comprises causing the fluid to flow through a strata of the radiator zone in direct contact with the strata.

16. The method of claim 11, wherein the step of causing the fluid contained in the subterranean water reservoir to flow further comprises causing the fluid to flow through the radiator zone within at least one well and along a section of the at least one well that extends horizontally in the radiator zone.

\* \* \* \* \*